United States Patent [19]

McNair et al.

[11] Patent Number: 5,458,052

[45] Date of Patent: Oct. 17, 1995

[54] FLAMEPROOF TOASTER

[75] Inventors: John D. McNair, Olinda; Howard C. Schulz, Coldstream; Aik P. Cheah, Clayton South; Gerard P. Gilliland, Ferntree Gully, all of Australia

[73] Assignee: Black & Decker Inc., Newark, Del.

[21] Appl. No.: 146,251

[22] Filed: Nov. 1, 1993

[30] Foreign Application Priority Data

Nov. 4, 1992 [AU] Australia .................................. PL5671
Jun. 3, 1993 [AU] Australia .................................. PL9157

[51] Int. Cl.$^6$ .................................................. A47J 37/08
[52] U.S. Cl. ............................... 99/385; 99/337; 99/391; 99/332
[58] Field of Search ........................... 99/389, 391, 393, 99/394, 385, 359, 339, 399, 392, 337, 332

[56] References Cited

U.S. PATENT DOCUMENTS

| | | | |
|---|---|---|---|
| 3,298,300 | 1/1967 | Grebow et al. ........................... | 99/385 |
| 3,636,858 | 1/1972 | Praskerson ............................... | 99/335 |
| 3,760,713 | 9/1973 | Sato ........................................ | 99/339 X |
| 4,254,695 | 3/1981 | Landry .................................... | 99/334 |
| 4,397,227 | 8/1983 | Landry .................................... | 99/334 |
| 4,404,899 | 9/1983 | Weiss ...................................... | 99/337 X |
| 5,181,455 | 1/1993 | Masel et al. ............................ | 99/389 X |
| 5,216,944 | 6/1993 | Trujillo ................................... | 99/339 |

OTHER PUBLICATIONS

Australian Patent Application—AU-A-44335/93 Jul. 29, 1993—14 Pages.

*Primary Examiner*—David Scherbel
*Assistant Examiner*—Patrick F. Brinson
*Attorney, Agent, or Firm*—Barry E. Deutsch

[57] ABSTRACT

A toaster is disclosed capable of retaining a fire within the body of the toaster should such a fire commence for any reason, the toaster comprising an outer housing, an inner enclosure defining a toasting compartment, an open access slot enabling access to the toasting compartment, movable flameproof member means either closing the access slot or opening same, movable carriage means in the toasting compartment to carry a product to be toasted, and latch means to hold the movable flameproof member means closed until manually released thereby ensuring a person is at the toaster should a fire have commenced in the toasting chamber.

14 Claims, 5 Drawing Sheets

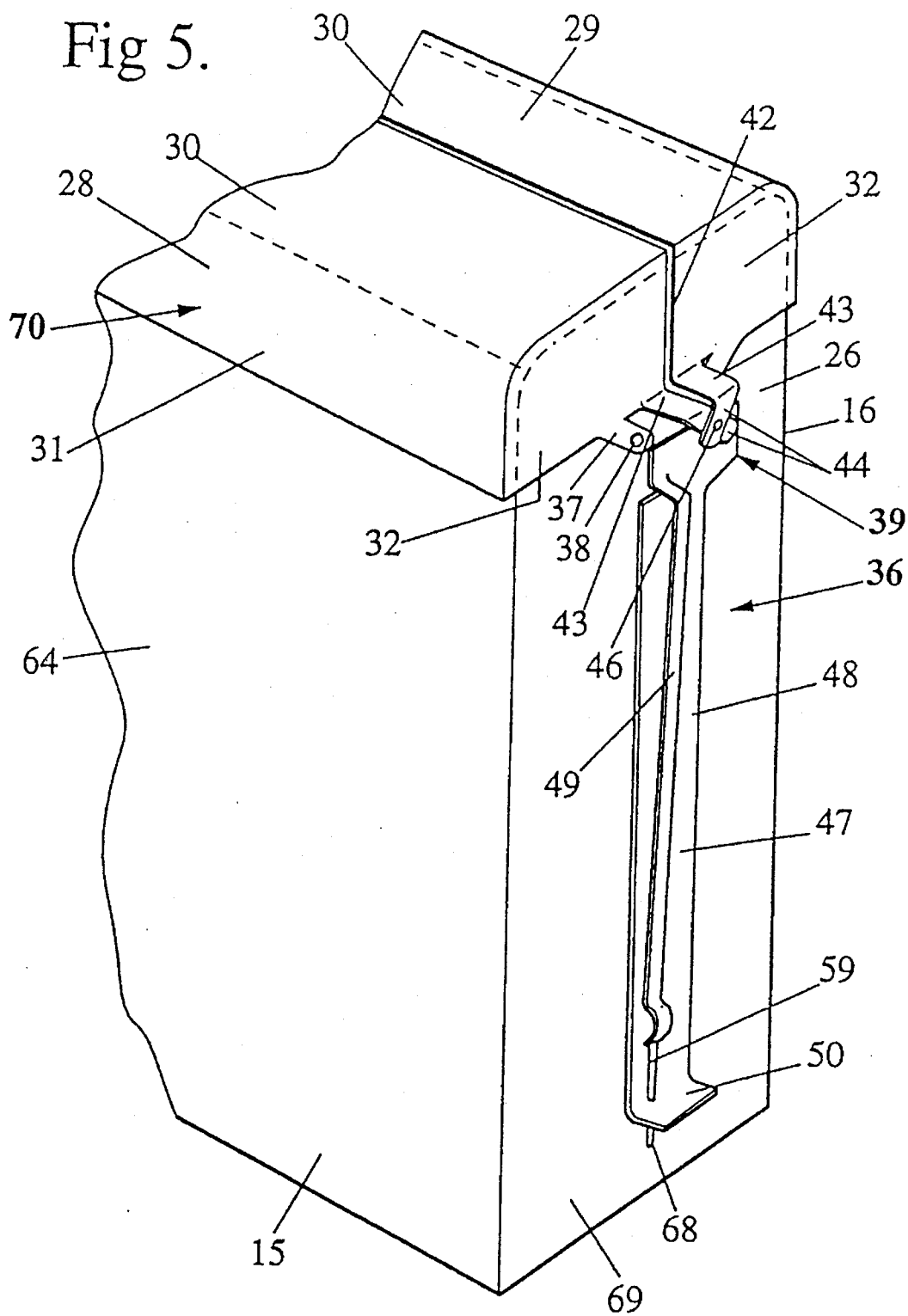

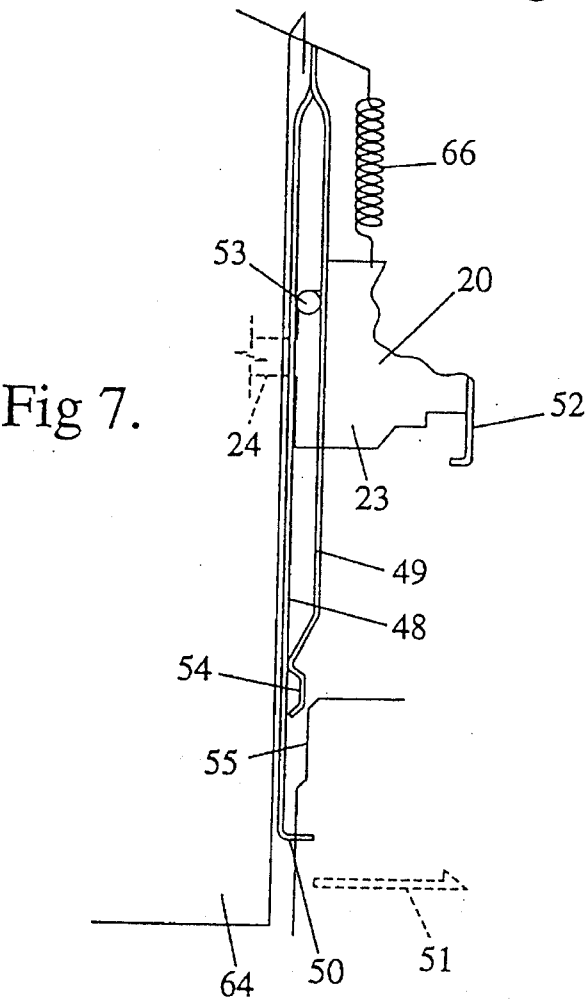
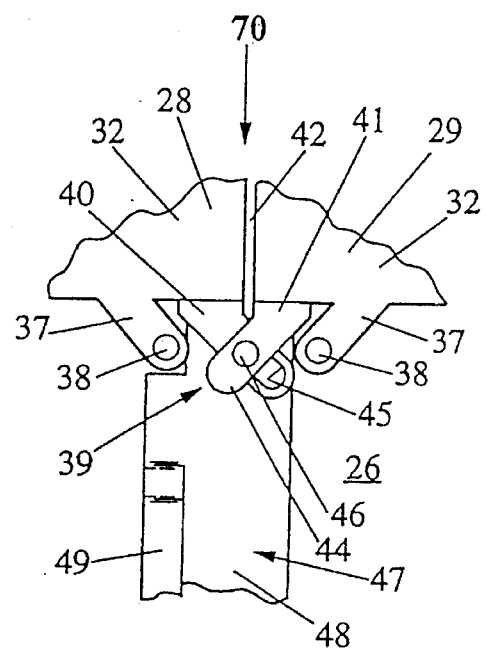
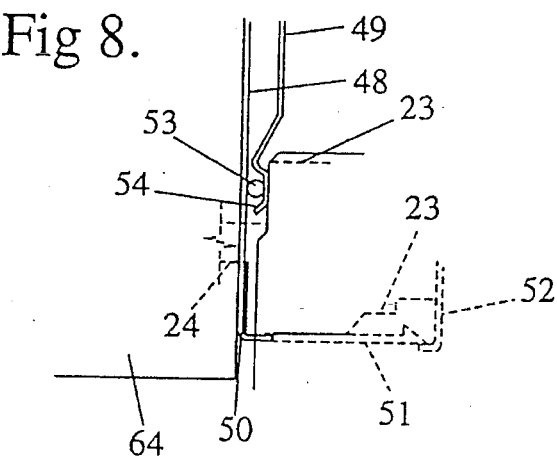

FLAMEPROOF TOASTER

BACKGROUND OF THE INVENTION

The present invention relates to improvements in toasters, particularly those toasters with one or more upwardly open slots to receive a product such as a slice of bread, a crumpet, a muffin or the like to be toasted. The invention is particularly aimed at toasters of the aforementioned kind having a single slot.

Although not very common, fires can occur when toasters are utilized. The causes of such fires include (1) a build-up of crumb material in the toaster base; and (2) a food product being toasted for a period of time that exceeds the normal level for that product due to operator misuse or a malfunction in the toaster itself.

The principal objective of the present invention is to provide a toaster which will prevent the effects of an escape of fire from a toaster in the unfortunate event of the occurrence of a fire. Toasters are generally required to be produced from materials that will not burn. Thus, even the plastic materials commonly used for many toaster bodies are made from resins which will not ignite. Thus, the effects of a toaster fire result from the flame escaping through the access opening to the toasting chamber.

SUMMARY OF THE INVENTION

Accordingly the present invention provides a toasting device including at least one toasting compartment with an access opening permitting a product to be toasted to be introduced into said toasting compartment, said device including flame proof member means capable of movement from a first position permitting access through said access opening to a second position closing said access opening, said flame proof member means, when in said second position, closing said access opening in a manner preventing escape of a flame from said toasting compartment. The flame proof member means may comprise one or a number of cover members. Conveniently the toaster includes means to define a toasting cycle and to discontinue power to toasting element means of the toaster upon completion of the toasting cycle, and a manually releasable latch mechanism preventing automatic movement of said flame proof member means to said first position upon completion of said toasting cycle.

In a particularly preferred arrangement, it is desired to provide a toasting device as aforesaid which ensures that the flame containment mechanism is necessarily used each time the device is used and more particularly that an operator is at the device when the toasted product is removed. That is to say, that the flame containment mechanism is always maintained in active operation until the toasted product is removed from the toasting compartment. In accordance with this aspect, the present invention provides a toasting device including at least one toasting compartment with an access opening for said toasting compartment, said device including flame proof member means capable of movement from a first position permitting access through said access opening to a second position closing said access opening, said flame proof member means, when in said second position, closing said access opening in a manner preventing escape of a flame from said toasting compartment, first control means being provided to automatically move said flame proof member means to said second position prior to completion of a toasting cycle, and second control means preventing said flame proof member means moving from said second position to said first position without manual intervention.

Conveniently the toasting device may include a product supporting carriage within said toasting chamber movable to a lowered position for a toasting cycle, actuation means being provided to enable movement of said carriage to said lowered position for toasting and said first control means being operably located so as to move said flame proof member means in response to movement of the product supporting carriage to said lowered position. Advantageously the flame proof member means comprises a single cover member adapted to, in use, overly said access opening. Preferably said second control means comprises a manually releasable latch means to maintain said flame proof cover means in said second position upon completion of a said toasting cycle until manually released.

In accordance with a still further aspect, the present invention aims at providing a closure for an open slot toaster, the closure at all times being retained within the confines of the toaster body.

According to this aspect, the present invention provides a toasting device including at least one toasting compartment with an access opening permitting a product to be toasted to be introduced into said toasting compartment, said device including flameproof member means capable of movement from a first position permitting access through said access opening to a second position closing said access opening, said flameproof member means when in said second position, closing said access opening in a manner preventing escape of a flame from said toasting compartment, and when said flameproof member means is in said second position, said flameproof member means is located within the confines of an outer housing of said toasting device.

In accordance with another aspect, the present invention provides a toasting device comprising a toasting compartment with an access opening permitting a product to be toasted to be introduced into said toasting compartment, said device including flameproof member means capable of movement from a first position permitting access through said access opening to a second position closing said access opening, said flameproof member means comprising at least two cover flap members which in said second position overly said access opening in a manner preventing escape of flame from said toasting compartment. Conveniently each said cover flap member comprises depending skirt members arranged in use in said second position to depend downwardly and outwardly of at least one wall of said toasting compartment.

Conveniently, the toasting cycle comprises an inner enclosure defining the toasting compartment and said outer housing surrounds said inner enclosure with at least one said access opening passing through both the outer housing and said inner enclosure, said flameproof member means being located at least partially between said inner enclosure and said outer casing when in said second position. Preferably said flameproof member means is formed by two cover members each of which is moved in opposite directions relative to one another when moving to said second position so as to be located substantially between said inner enclosure and said outer housing.

Conveniently operating means is provided connected to said cover members to move said cover members between said first and second positions. Preferably, said operating means moves said cover members in response to movement of a product support carriage in said toasting compartment, said operating means acting to move said cover members to the second (or closed) position when said product support carriage has moved through at least 70% and preferably between 85 and 95% of its permitted travel from its upper limit. Advantageously the operating means moves said cover members to said first (or open) position within 0 to 15% of the permitted travel of the product support carriage from the bottom toasting position of the support carriage. Conveniently, the cover members commence moving to their first (or open) position immediately the product support carriage starts to move upwardly.

BRIEF DESCRIPTION OF THE DRAWING

Preferred embodiments of the present invention will be described hereinafter with reference to the accompanying drawing in which:

FIG. 5 is a partial perspective view of one end of the toasting compartment of the toaster of FIG. 3 with the outer casing and other parts removed for the sake of clarity;

FIG. 6 is an end elevation view of an upper part of the mechanism shown in FIG. 5;

FIG. 7 is a side elevation view of a lower part of the mechanism shown in FIG. 5; and FIG. 8 is a view similar to FIG. 7 showing the mechanism in a different position of use.

DESCRIPTION OF THE PREFERRED EMBODIMENTS

Figure 1:
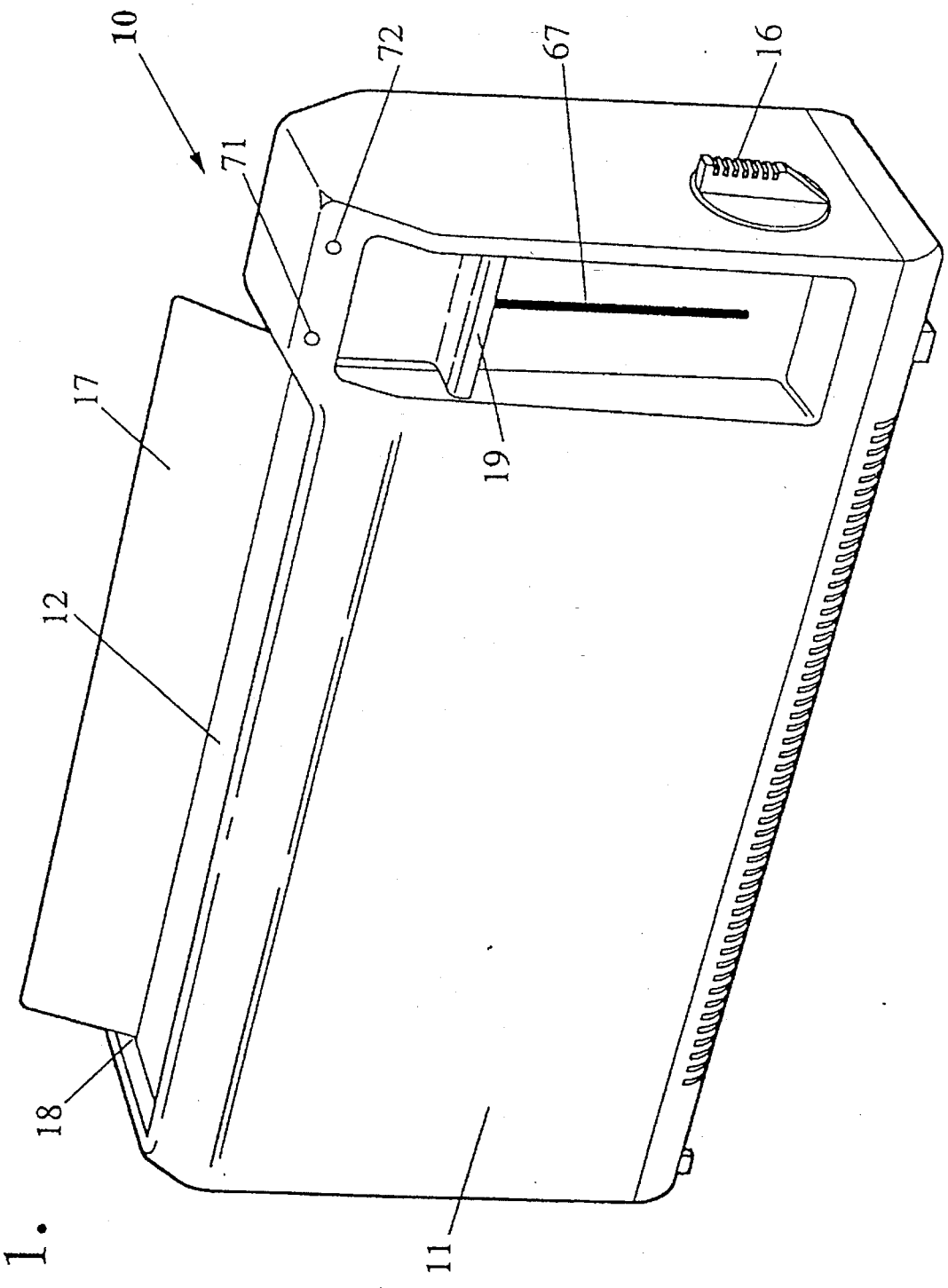
FIG. 1 is a perspective view of a double slice single slot toaster according to the present invention.

Referring to the drawing, a toaster 10 is shown with an outer casing body 11 defining an upper access opening 12 to a vertically arranged toasting compartment 13. The compartment 13 includes resistance heating elements 31 arranged on either side of the toasting compartment 13 in any conventional or known array. The casing body 11 illustrated is a non burnable plastic material, however, it is clearly also possible to use any other non burnable material such as sheet metal. The casing body 11, however, provides a substantially enclosed inner space accessed only through the upper access opening or slot 12. Arranged within the toasting compartment 13 is a product supporting carriage 14 movable between an upper product receiving position and a lowered position (FIG. 2) for a toasting cycle. At one end of the compartment 13, the carriage 14 is moved corresponding to movement of the lug 19. Alternatively a motorized movement mechanism could be provided to move the carriage 14 between the upper and lower positions. A conventional or known brownness selection knob 16 is provided together with any suitable and known toasting control system. Obviously the system should preferably include features adapted to minimize the likelihood of fires commencing, however, these features are not relevant to the present invention and are not further discussed hereinafter.

Figure 2:
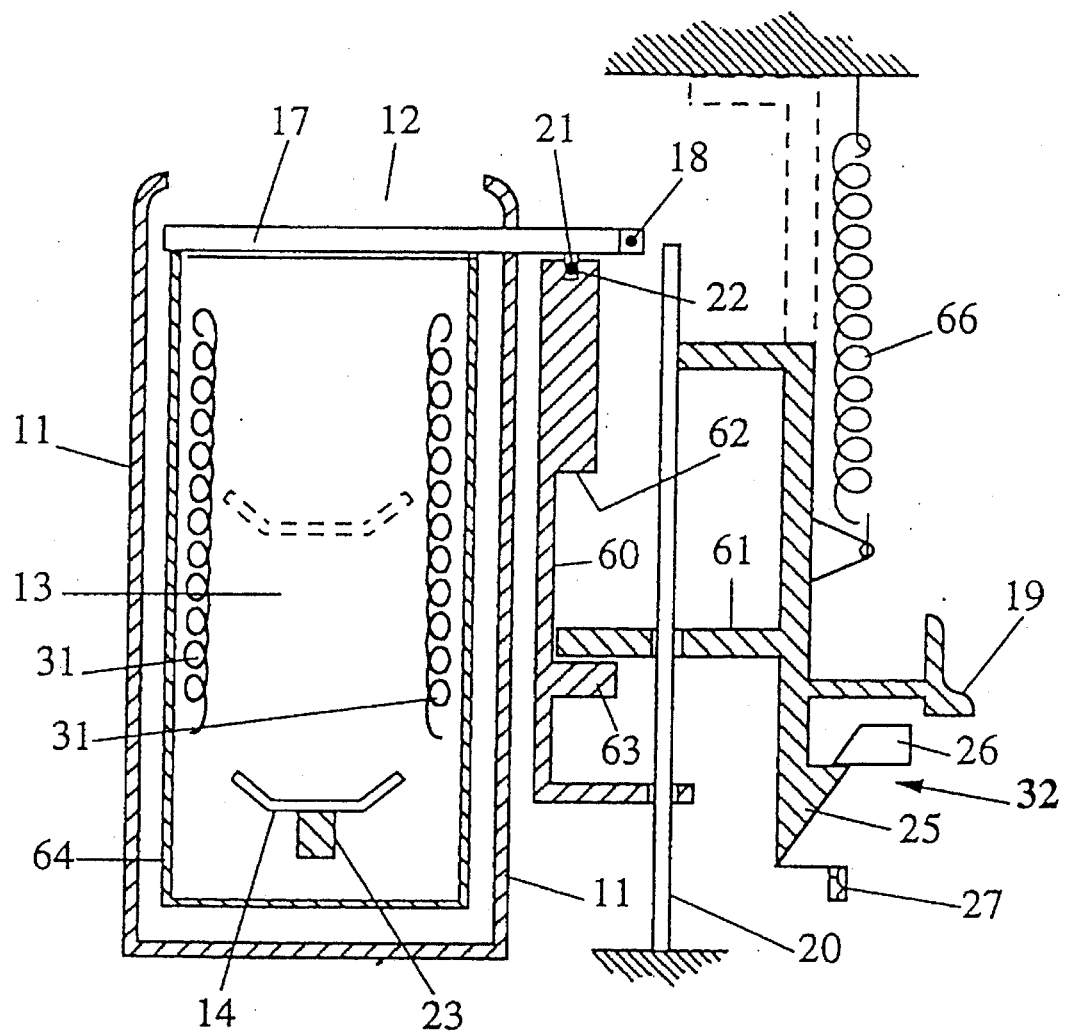
FIG. 2 is a schematic illustration of one form of control mechanism usable with the toaster shown in FIG. 1.
Figure 3:
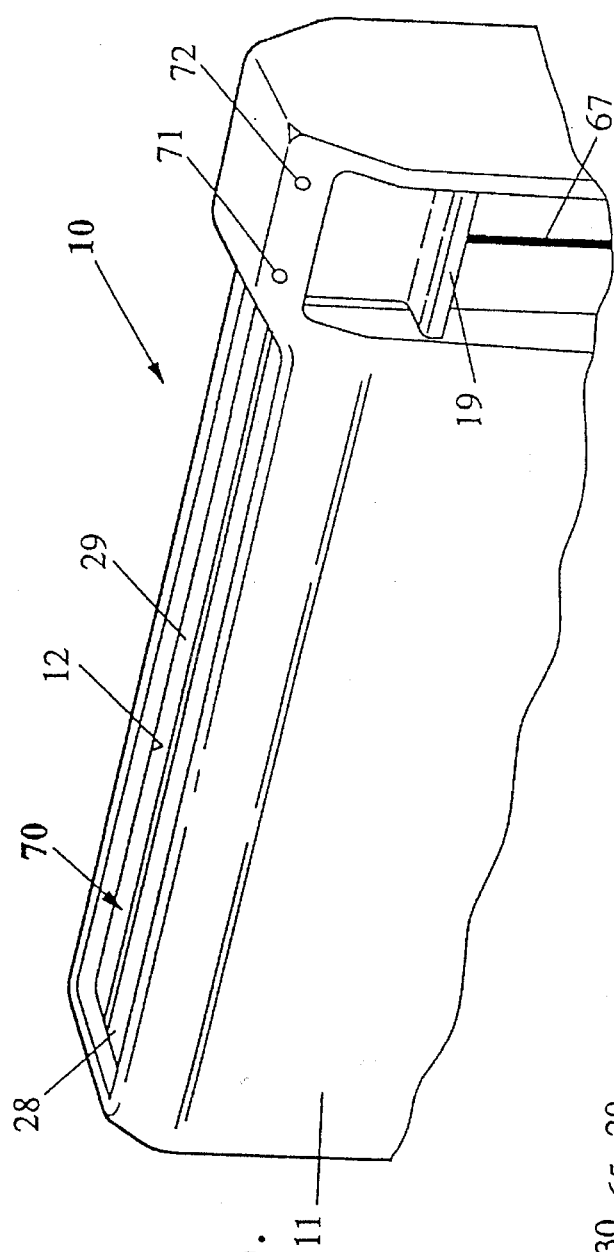
FIG. 3 is a perspective view of the top section of a toaster similar to FIG. 1 showing a second preferred embodiment.

As shown in FIGS. 1 and 2, a flameproof member in the form of a cover flap 17 is provided hinged at 18 along one side of the access slot 12 so that it can be pivoted from an access providing position (FIG. 1) to a second position overlying the slot 12 as shown in FIG. 2. The flap member 17 may be formed from any other material that prevents a flame passing outwardly from the toasting compartment 13.

One possible form of linkage connection means is shown in FIG. 2 although it should be appreciated that other arrangements could also be employed. The mechanism is shown outwardly of the body 11 in schematic fashion although normally the mechanism would be located within the body 11 adjacent one end of the toasting compartment 13. As shown in FIG. 2, a lost motion link 60 is provided so that it slides up and down on a stationary substantially vertical guide member 20. An upper end of the link 60 is pivoted at 21 to a transversely extending part 22 of the cover 17. A carriage supporting member 23 is moved up and down on the guide member 20 by actuation of the external lug 19. The member 23 is generally urged upwardly by a spring element 66 so that the carriage 14 is normally located in its upper position. A lower end 25 of the member 23 mechanically latches with a catch member 26 when the member is moved to lower the carriage 14 to the lowered toasting position. In so doing a wake up or power actuating switch 27 is activated to enable power supply to the toasting elements for commencement of a toasting cycle. Alternatively a separate manually operable toasting cycle start up switch could be employed for reasons discussed hereinafter.

As illustrated in FIG. 2, the member 23 includes a portion 61 which is adapted to engage opposed abutment parts 62 and 63. Thus with the cover flap 17 in an open position (FIG. 1) the lug 19 and therefor the member 23 must be moved downwardly a certain distance before the portion 61 engages the abutment part 63 to thereafter automatically move the cover flap 17 from the position shown in FIG. 1 to the closed position shown in FIG. 2. Similarly there is a certain distance of travel of the lug 19 upwardly from the position shown in FIG. 2 before the portion 61 engages the part 62 to commence opening of the cover flap 17. This arrangement enables the cover flap 17 to be manually moved to the closed position (FIG. 2) without movement of the lug 19 for storage purposes. In an alternative arrangement, if the wake up switch 27 is omitted and a separate start up switch is used, then the lug 19 can be moved to its lowered position so that the end 25 catches with catch member 26 to lower the cover flap 17 for storage without the need of any lost motion mechanism as illustrated in FIG. 2. It is, however, desirable with this latter configuration that some separate means be provided to ensure that the separate start up switch does not commence a toasting cycle with the cover flap 17 in an open position.

In accordance with a preferred aspect of the present invention, the latch mechanism 32 identified illustratively in FIG. 2 by members 25,26 form an automatic mechanical latch which must be manually delatched to enable the cover flap 17 to be only operable by a person upon completion of a toasting cycle. Thus, in the unlikely event of a fire having ignited in the chamber, the cover flap 17 will not have automatically opened by the toaster mechanism (when unattended by the operator) to allow flames to escape from the compartment 13.

Figure 4:
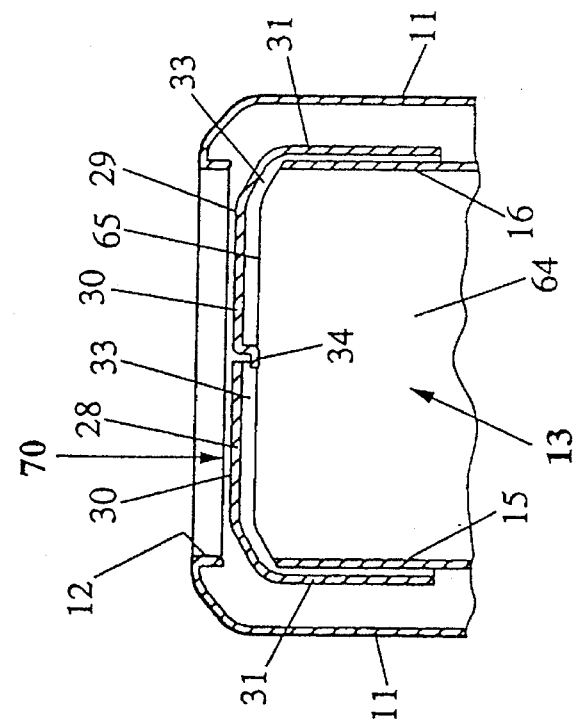
FIG. 4 is a traverse section through the access slot region of a toaster as shown in FIG. 3.

FIGS. 3 to 8 illustrate a second preferred embodiment of the present invention. In this embodiment, the toaster 10 also has an outer casing 11 (preferably formed from a non-burnable plastics material, metal or the like) having an upper access slot 12 adapted to receive a product to be toasted and to ultimately eject a toasted product therethrough after completion of a toasting cycle. As can be seen in FIGS. 4 and 5, an inner enclosure 64 is provided (conveniently produced from sheet metal) within the outer casing 11, the inner enclosure also has a generally rectangular upper access opening 65 substantially aligned with the access slot 12 in the outer casing. The inner enclosure 64 defines a toasting compartment 13 with heating elements of any known configuration (not shown) located adjacent the inner face of each longitudinal side wall 15,16 directing radiant and convection heat inwardly of the toasting compartment 13 when energized. Similar to FIG. 1, a lug 19 capable of being operatively gripped is provided which is directly connected to a product support carriage 14 located at least partially within the toasting compartment 13. The product support carriage 14 is mounted on a vertical slide post (not shown) so that it is capable of movement upwardly and downwardly thereon. A spring 66 is provided to normally urge the carriage 14 upwardly but against which an operator can move the carriage 14 down to a lowered toasting position by gripping the member 19 and moving same downwardly in the slot 67 in the outer casing 11. The product supporting carriage 14 has a part 23 located outwardly of the toasting chamber 13 and a part 24 located within the toasting chamber on which a slice of bread or the like is supported during a toasting cycle. The part 24 extends through a vertical slot 68 in an end wall 69 of the inner enclosure 64.

As shown in FIGS. 3 to 6, a closure means 70 is provided arranged to overly the access openings 12,14 to the toasting compartment 13. In the preferred embodiment illustrated, the closure means is conveniently located generally between the outer casing 11 and the inner enclosure 64 and comprises a pair of cover members 28,29. Each cover member 28,29 comprises an upper plate 30 covering approximately half of the access opening 65 when closed, a longitudinally extending side plate 31 adapted to extend downwardly from the access opening 65 outwardly of one of the inner enclosure side walls 15,16 and a pair of end plates 32,33 adapted to extend downwardly and outwardly of the end walls of the inner enclosure 64. One of the cover members 28,29 preferably has an inwardly (or outwardly) located laterally extending lip 34 adapted to overly the small longitudinally extending space between the cover members 28,29 when closed as illustrated in FIG. 4. Conveniently, if the cover members 28,29 are to be identically shaped (as may be desirable for manufacturing purposes) the lip 34 may extend over only half the length of the cover member 28 or 29 so that in an assembly, the overlying lip extends from each cover member over half the length of the cover member with an overlying obstruction thereby extending the full length of the access opening 65. By this means, the escape of flame is prevented from the toasting chamber 13 between the cover members 28,29.

An operating mechanism 36 for moving the cover members 28,29 from the generally closed (illustrated) position to an open position is best seen in FIGS. 5 to 8 of the annexed drawings. Each end plate 32,33 of the cover members has a downwardly depending hinge plate member 37 so as to locate a fixed hinge connection 38 to an end wall 69 of the inner enclosure 64 downwardly of the lower edge of the cover members 28,29 and outwardly spaced from the central dividing line 42 between the cover members 28,29. In addition a floating hinge connection 39 is provided acting between the two cover members 28,29. The floating hinge connection is formed by tab members 40,41 located at the lower edge of the members 28,29 adjacent the dividing line 42 between the cover members 28,29. Each tab member 40,41 has a first portion 43 extending outwardly from and at the same level as the lower edge of the cover member and a second portion 44 extending downwardly and towards or across the dividing line 42. One or both of the portions 44 includes a slot 45 and a hinge pin 46 extends through portion 44 connecting same together with a downwardly directed link member 47. Movement of the link member 47 downwardly or upwardly causes the hinge pin 46 to move downwardly or upwardly. As a result the cover members pivot about hinge pins 38 and also tend to move outwardly when opening or inwardly when closing because of the floating hinge 39 caused by the slot or slots 45. Thus the cover members 28,29 can be arranged to completely close the access opening 65 to the inner enclosure 64 (when closed), or open this access opening 65 with the cover members 28,29 moving to a position between the outer casing 11 and the inner enclosure 64.

The operating link member 47 is divided along most of its length from its lower end to form a first part 48 and a second part 49. The first part 48 has a lateral tab 50 at its lowermost end which is engaged by he carriage part 23 on its downward travel near to the end of its downward travel and in so doing the final downward movement of the carriage part 23 drags with it the link member 47 and thereby the pivot pin 46 to close the cover members 28,29. FIG. 7 shows the carriage part 23 at its uppermost position whereas FIG. 8 shows the carriage part 23 at its lowered toasting position. In the lowered toasting position, the carriage part 23 has been stopped by a physical limit ledge 51 and a manual latch member 52 has been engaged to prevent the carriage part 23 from moving upwardly from the position shown in FIG. 5 whether or not a toasting cycle has been completed. Moreover in the lowered toasting position (FIG. 8), a dowel pin 53 carried by the carriage part 23 is engaged in a recess 54 formed in the lower end of the second part 49 of the link member 47 and is locked therein by fixed cam ledge 55. Thus when the carriage part 23 is moved upwardly at the end of a toasting cycle and after delatching the member 52, the dowel pin 53 drives the second link 49 upwardly (and thereby the link member 47 and hinge pin 46) to immediately open the cover members upon the carriage 20 starting its upward eject motion. A slot 59 is formed in the part 48 of the link member 47 and the carriage part 24 extends through the slot 59 and slot 25 into the toasting chamber 13. The carriage part 24 through spring 66 keeps the link 47 in its up position in the absence of external manipulation. As will be apparent from the foregoing, the latch member 52 and latch 51 form an automatically engaged manual latch which must be manually delatched to enable the cover members 28,29 to be opened and necessarily requires the attention of a person at the toaster when this event occurs. Thus in an unlikely event of a fire having ignited in the chamber, the cover members 28,29 will not have been automatically opened by the toaster mechanism (when unattended by the operator) thereby allowing flames to escape from the toasting chamber 13. Conveniently, to assist operation of the toaster, visual and/or audible indicators 71,72 may be provided to show that a toasting cycle has commenced and separately has been completed. Although the foregoing description has been given with reference to a toaster having a carriage 23 moved manually down and a spring 66 to eject the toasted product, it should of course be appreciated that any known mechanism for driving or moving the carriage 23 might also be employed.

While preferred embodiments of the invention have been described and illustrated, the invention should not be limited thereto but may be otherwise embodied with the scope of the following claims:

1. A toasting device including at least one toasting compartment with at least one access opening for said toasting compartment, said device including flameproof member means capable of movement from a first position permitting access through each said access opening to a second position closing each of said access opening, said flameproof member means, when in said second position, closing each said access opening in a manner preventing escape of a flame from each said access opening, first control means being provided to automatically move said flameproof member means to said second position prior to completion of a toasting cycle, and second control means preventing said flameproof member means moving from said second position to said first position at the completion of the toasting cycle in the absence of manual intervention, said second control means moving said flameproof member means from said second position to said first position solely in response to manual intervention.

2. A toasting device according to claim 1 wherein said flameproof member means is moved to said second position by said first control means prior to commencement of said toasting cycle.

3. A toasting device according to claim 1 wherein said second control means includes a mechanical latch requiring manual delatching at the completion of the toasting cycle to enable said flameproof member means to be able to move to said first position.

4. A toasting device according to claim 3 further including an outer housing located outwardly of said toasting compartment, said flameproof member means, when in said second position, being located substantially within the outer housing.

5. A toasting device according to claim 4 wherein said flameproof member means comprises two cover members for each said toasting compartment.

6. A toasting device according to claim 5 wherein each said cover member includes depending skirt members arranged in use, in said second position, to depend downwardly and outwardly of at least one wall of said toasting compartment.

7. A toasting device according to claim 6 wherein each said toasting compartment is located within an inner enclosure and said outer housing surrounds said inner enclosure with at least one said access opening passing through both the outer housing and said inner enclosure, said cover members being located at least partially between said inner enclosure and said outer housing when in said first position.

8. A toasting device according to claim 7 further including operating means for each said cover member to control movement of said cover member between said first and second positions, said operating means acting in response to movement of a product support carriage within said toasting compartment to control movement of the cover member between said first and second positions.

9. A toasting device according to claim 8 wherein said operating means acts to move said cover member to the second position when said product support carriage has moved through at least 70% of permitted carriage movement in a direction towards a toasting position.

10. A toasting device according to claim 9 wherein said operating means acts to move said cover members to the first position within 0 to 15% of permitted carriage movement away from a toasting position.

11. A toasting device including at least one toasting compartment with at least one access opening permitting a product to be toasted to be introduced into said toasting compartment, said device including flameproof member means capable of movement from a first position permitting access through each said access opening to a second position closing each said access opening in a manner preventing escape of a flame from each said toasting compartment, and when said flameproof member means is in said second position, said flameproof member means is located within the confines of an outer housing of said toasting device, and control means preventing said flameproof member means moving from said second position to said first position at the completion of the toasting cycle in the absence of manual intervention, said control means moving said flameproof meander means from said second position to said first position solely in response to manual intervention.

12. A toasting device according to claim 11 wherein the flameproof member means is formed by two cover members.

13. A toasting device comprising a toasting compartment with an access opening permitting a product to be toasted to be introduced into said toasting compartment, said device including flameproof member means capable of movement from a first position permitting access through said access opening to a second position closing said access opening, said flameproof member means comprising at least two cover flap member means which in said second position overly said access opening in a manner preventing escape of flame from said toasting compartment, and control means preventing said flameproof member means moving from said second position to said first position at the completion of the toasting cycle in the absence of manual intervention, said control means moving said flameproof member means from said second position to said first position solely in response to manual intervention.

14. A toasting device according to claim 13 wherein said cover members in said second position have adjacent edges extending longitudinally of each said access opening, said cover members moving sideways and downwardly when being moved to said first position.

* * * * *